United States Patent
Wu et al.

(10) Patent No.: US 8,582,328 B2
(45) Date of Patent: Nov. 12, 2013

(54) POWER SUPPLY CIRCUIT AND METHOD THEREOF

(75) Inventors: Chung-Wen Wu, Yilan County (TW); Chien-Cheng Tu, Hsinchu (TW); Wen-Hsuan Lin, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 374 days.

(21) Appl. No.: 12/578,666

(22) Filed: Oct. 14, 2009

(65) Prior Publication Data

US 2010/0289467 A1    Nov. 18, 2010

(30) Foreign Application Priority Data

May 14, 2009   (TW) ................................. 98116067 A

(51) Int. Cl.
*H02M 3/335*    (2006.01)

(52) U.S. Cl.
USPC ................... 363/21.15; 348/E5.127; 323/902

(58) Field of Classification Search
USPC ................. 363/21.15, 21.07, 21.13; 323/902; 348/E5.127; 713/323
See application file for complete search history.

(56) References Cited

U.S. PATENT DOCUMENTS

| | | | | |
|---|---|---|---|---|
| 5,689,407 A | * | 11/1997 | Marinus et al. | 363/21.15 |
| 6,111,762 A | * | 8/2000 | Igarashi et al. | 363/21.16 |
| 6,208,533 B1 | * | 3/2001 | Ogawa | 363/21.08 |
| 6,314,004 B1 | * | 11/2001 | Higuchi | 363/21.07 |
| 7,002,814 B2 | * | 2/2006 | Kim et al. | 363/21.15 |
| 7,040,727 B2 | * | 5/2006 | Ryu et al. | 347/5 |

FOREIGN PATENT DOCUMENTS

| | | | | |
|---|---|---|---|---|
| JP | 10248256 A | * | 9/1998 |
| JP | 2002119051 A | * | 4/2002 |
| JP | 2004040858 A | * | 2/2004 |
| JP | 2004120826 A | * | 4/2004 |

* cited by examiner

*Primary Examiner* — Harry Behm
(74) *Attorney, Agent, or Firm* — Rabin & Berdo, P.C.

(57) ABSTRACT

In a normal mode, the power supply is fed back in a close loop, but in a power saving mode, the power supply is fed back in an open loop. When it is detected that the power supply is continuously fed back in the open loop and in a substantially zero output status, the power supply circuit enters a power down status. If the back-stage circuit needs power supply again, then the feedback is switched to the close loop and the power supply circuit enters the normal mode.

13 Claims, 4 Drawing Sheets

POWER SUPPLY CIRCUIT AND METHOD THEREOF

This application claims the benefit of Taiwan application Serial No. 98116067, filed May 14, 2009, the subject matter of which is incorporated herein by reference.

FIELD

The invention relates in general to a power supply circuit, and more particularly to a high-efficiency power supply circuit.

BACKGROUND

Displays or TV display devices have become indispensible in modern people's daily life. The display can be used as a screen of the personal computer for displaying computer data. Watching TV is a popular entertainment to people.

As the concept of environmental conservation attracts more and more attention, more and more electronic devices are featured with power-saving function. However, when conventional electronic devices enter a power saving mode, an internal switching power circuit, which is much power consuming, is still in normal operation mode, so the power-saving efficiency is limited.

SUMMARY

Examples of the invention are directed to a power supply circuit and method thereof, wherein, in power saving mode, the power supply is fed back in an open loop. In normal mode, the power supply is fed back in a close loop. When it is detected that the power supply is continuously fed back in an open loop, and in substantially zero output status, then the power supply circuit enters a power down status.

In Examples of the invention, if the back-stage circuit needs power supply again, then the feedback is switched back to a close loop and the power supply circuit enters a normal mode.

An embodiment of the present invention provides a power supply circuit. The power supply circuit provides a power voltage to a back-stage circuit. The power supply circuit includes a switching power circuit, a close loop feedback control, and an open loop feedback control. The switching power circuit is used for controlling the power voltage. In a normal mode, the close loop feedback control feeds back the power voltage to the switching power circuit in a close loop. In a power saving mode, the open loop feedback control feeds back the power voltage to the switching power circuit in an open loop. When the switching power circuit continuously detects the open loop and the switching power circuit is substantially in a zero output status, the switching power circuit enters the power down mode.

Another embodiment of the present invention provides a power supply method providing a power voltage to a back-stage circuit. In a normal mode, the power voltage is fed back in a close loop, but in a power saving mode, the power voltage is fed back in an open loop. When the open loop is continuously detected, a power down mode is entered.

It is to be understood that both the foregoing general description and the following detailed description are exemplary and explanatory only and are not restrictive of the disclosed embodiments, as claimed.

DETAILED DESCRIPTION OF EXAMPLES OF THE INVENTION

According to one of embodiments of the invention, when in a power saving mode, the power supply is fed back in an open loop, but when in a normal mode, the power supply is fed back in a close loop. When it is detected that the power supply is continuously fed back in the open loop and the switching power circuit is in a zero output status, then the switching power circuit enters a power down mode. If the back-stage circuit needs power supply again, then the feedback is switched back to the close loop, and the power supply circuit enters the normal mode.

Figure 1:
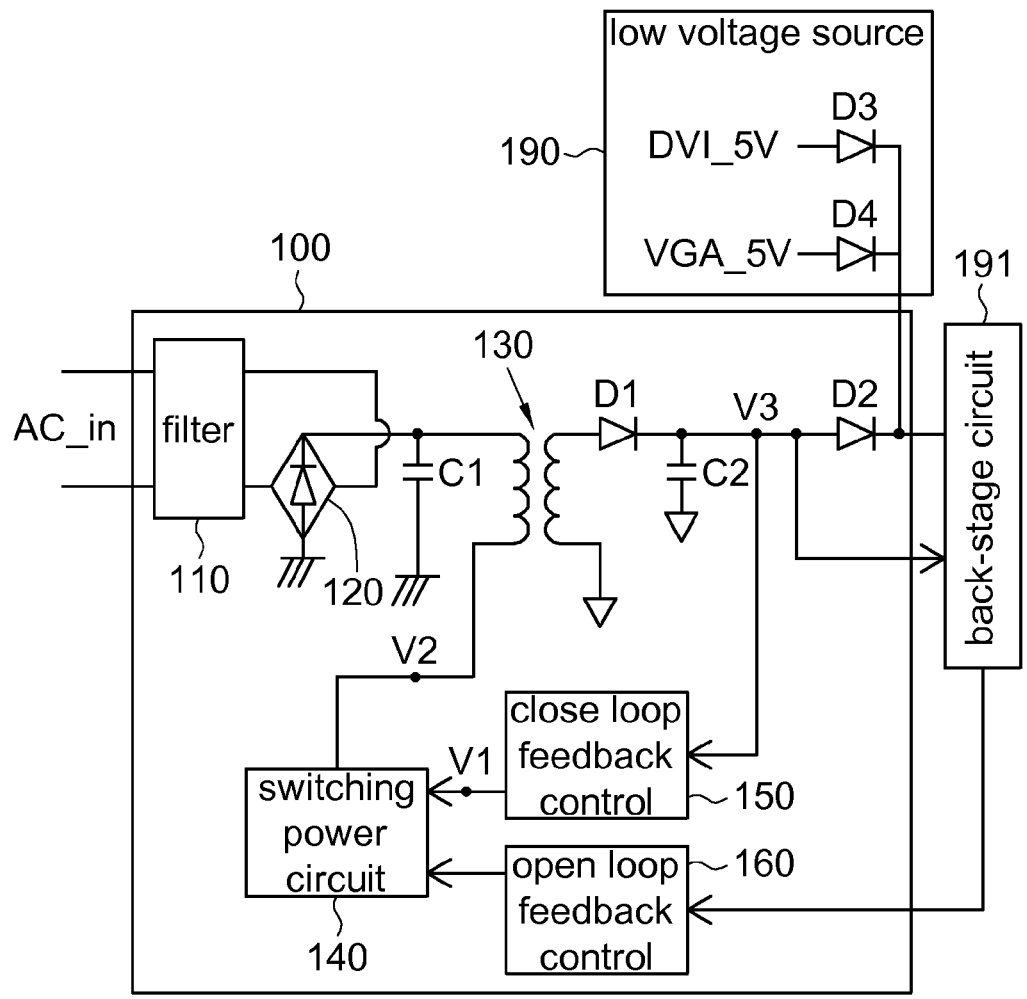
FIG. 1 shows a low-voltage power supply circuit according to an embodiment of the invention.

FIG. 1 shows a low-voltage power supply circuit according to an embodiment of the invention. The low-voltage power supply circuit is disposed in the electronic device such as a display or an LCD screen. As indicated in FIG. 1, the low-voltage power supply circuit 100 includes a filter 110, a rectifier 120, an transformer 130, a switching power circuit 140, a close loop feedback control 150, an open loop feedback control 160, two capacitors C1~C2 and two diodes D1~D2. The low-voltage power supply circuit 100 converts an alternating current (AC) voltage source AC_in to a direct current (DC) voltage source which is provided to the back-stage circuit 191. The AC voltage source AC_in is an 110V utility for example.

A low voltage source 190 provides a selective DC voltage source (such as DVI or VGA), which is inside the electronic device and rectified by diodes D3~D4, to the back-stage circuit 191. However, the current provided by the low voltage source 190 is lower and the selective DC voltage source may not exist.

The filter 110 is used for filtering the voltage source AC_in. The filter 110 is an electromagnetic interference (EMI) filter for example. The output voltage of the filter 110 is outputted to the rectifier 120 which rectifies the output voltage from the filter 110 into a DC voltage. The rectifier 120 is a bridge rectifier for example.

The switching power circuit 140 outputs a control voltage V2 according to a voltage fed back from the close loop feedback control 150. The control voltage V2 is outputted to a primary side of the transformer 130. Through the coupling by the transformer 130, the control voltage V2 is coupled to a secondary side of the transformer 130. The switching power circuit 140 controls the coupling of the transformer 130. To put it in greater details, the larger the output duty cycle of the switching power circuit 140 is, the longer the coupling period of the transformer 130 will be, and vice versa. Besides, when the output duty cycle of switching power circuit 140 equals 0, the transformer 130 does not perform coupling so that the magnetic loss is further reduced.

The diode D1~D2 rectify the output voltage of the secondary side of the transformer 130 and provide to the back-stage circuit 191. The back-stage circuit 191 is a scalar circuit for example. Furthermore, for further voltage regulation, a low drop out (LDO) regulator may be selective disposed between the back-stage circuit 191 and the diode D2.

The close loop feedback control 150 feeds back the DC voltage V3 to the switching power circuit 140 in a close loop. That is, the switching power circuit 140 generates a PWM output signal according to the output voltage V1 of the close loop feedback control 150, wherein the PWM output signal controls the level of the control voltage V2. When the low-voltage power supply circuit 100 is in a normal mode, the close loop feedback control 150 is in a close loop and feeds back the voltage V3 to the switching power circuit 140 in a close loop. Thus, the low-voltage power supply circuit 100 reflects the load change of the back-stage circuit 191. For example, the larger the load is, the larger the duty cycle of the PWM output signal generated by the switching power circuit 140 will be, and vice versa.

Under a power saving mode, the open loop feedback control 160 forms an open loop and the close loop is opened, so that the voltage V3 is not fed back to the switching power circuit 140 through the close loop feedback control 150. Under certain conditions, the switching power circuit 140 enters a power down mode to further save power. As the switching power circuit 140 enters the power down mode, the transformer 130 does not perform energy coupling, so the transformer 130 does not transmit energy to the capacitor C2. As the charge is not accumulated in the capacitor C2 (i.e. the capacitor C2 is not charged further), the voltage V3 steps down after the charge stored in the capacitor C2 is consumed (for example, the charge may be consumed by inside element of the close loop feedback control 150). If the voltage V3 steps down too low, the switching power circuit 140 will be re-set, and circuit error operations will occur. In the present embodiment of the invention, if the voltage V3 is lower than a critical value, the switching power circuit 140 resumes into the normal mode from the power down mode. The power consumed by the switching power circuit 140 is reduced by switching the switching power circuit 140 between the power down mode and the normal mode.

Figure 2:
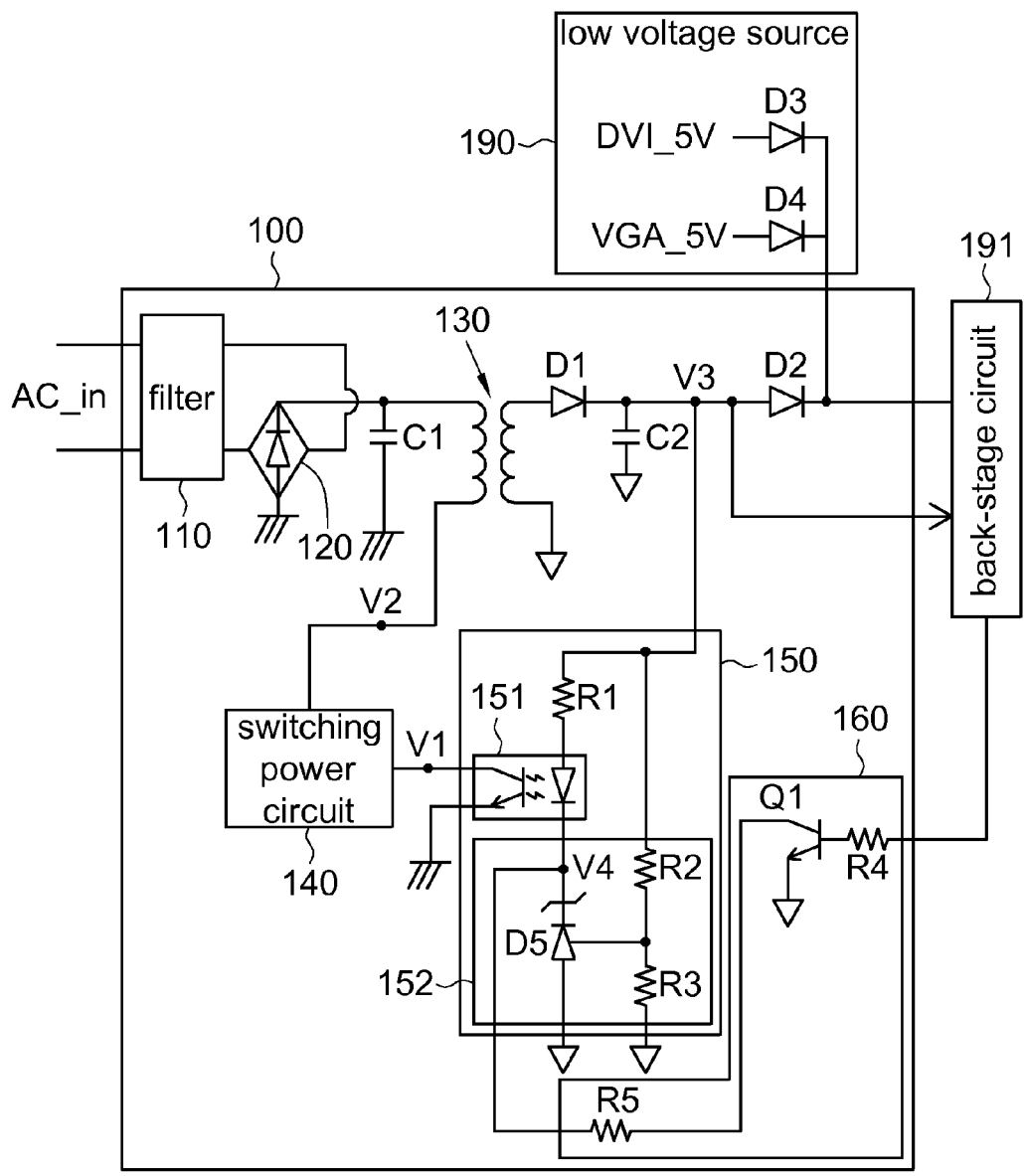
FIG. 2 shows a detailed circuit diagram of a close loop feedback control and an open loop feedback control of the low-voltage power supply circuit according to the embodiment of the invention.

FIG. 2 shows a detailed circuit diagram of the close loop feedback control 150 and the open loop feedback control 160 of the low-voltage power supply circuit 100 according to the embodiment of the invention. As indicated in FIG. 2, the close loop feedback control 150 includes a photo-coupling circuit 151, a voltage reference controller 152 and a resistor R1. The voltage reference controller 152 includes a diode D5, and two resistors R2~R3. The open loop feedback control 160 includes a transistor Q1, and two resistors R4~R5.

In the normal mode, the transistor Q1 is turned off, the voltage feedback path (i.e. the close loop feedback) is formed by the photo-coupling circuit 151 and the voltage reference controller 152, and the voltage V3 is fed back to the primary side of the transformer 130 from the secondary side of the transformer 130. To the contrary, in the power saving mode, the transistor Q1 is turned on and the voltage reference controller 152 is activated. As the voltage V4 is suppressed by the transistor Q1, the close loop feedback is not formed. The open loop feedback control 160 sinks the current provided by the voltage reference controller 152, and does not output current to the voltage reference controller 152. Meanwhile, in the power saving mode, as the output duty cycle of the switching power circuit 140 decreases (even as low as 0), the voltage V3 gradually steps down because the charges stored in the capacitor C2 are consumed by the resistors R2~R3. Besides, the voltage reference controller 152 regulates the voltage V3. When an open loop exists (that is, the close loop is interrupted), the voltage reference controller 152 is not in normal operation.

Figure 3:
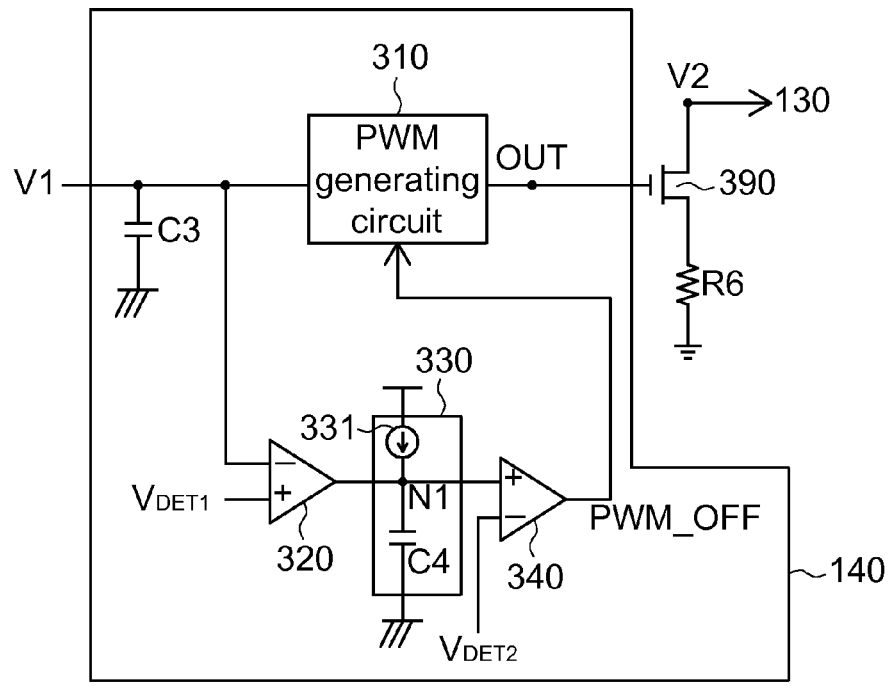
FIG. 3 shows a circuit diagram of a switching power circuit according to the embodiment of the invention.

FIG. 3 shows a circuit diagram of the switching power circuit 140 according to the embodiment of the invention. As indicated in FIG. 3, the switching power circuit 140 includes a PWM generating circuit 310, a comparer 320, a delay loop 330, a comparer 340 and a capacitor C4. The comparer 320, the delay loop 330 and the comparer 340 form a PWM control circuit for controlling whether the PWM generating circuit 310 enters a power down mode. To put it in greater details, in a power saving status, if the output duty cycle of the PWM generating circuit 310 is lower than a critical point or equals 0%, then the PWM generating circuit 310 enters into the power down mode to save power consumption.

The output duty cycle (that is, the duty cycle of the output signal OUT) of the PWM generating circuit 310 is relevant to the voltage V1. The architecture of the PWM generating circuit 310 is not specified here. The PWM generating circuit 310 further includes an oscillator (not illustrated in the diagram).

The comparer 320 compares the voltage V1 with the reference voltage $V_{DET1}$. For example, when the voltage V1 is higher than the reference voltage $V_{DET1}$, the output signal of the comparer 320 is in low logic status, and vice versa.

The delay loop 330 includes a current source 331 and a capacitor C4. When the comparer 320 outputs high logic signals, charges outputted by the current source 331 are accumulated in the capacitor C4 (i.e. the capacitor C4 is charged), and the voltage of the node N1 boosts gradually. When the comparer 320 outputs low logic signals, the charges accumulated in the capacitor C4 are discharged through the internal discharge path of the comparer 320, and the voltage of the node N1 steps down to 0.

When load of the back-stage circuit 191 is seriously changed, the voltage V1 will be too low. Under such circumstances, the switching power circuit 140 does not enter into the power down mode to prevent error operations. In the present embodiment of the invention, the timing when the switching power circuit 140 enters into the power down mode is desired in the power saving mode. The delay loop 330 and the comparer 340 avoid error operations. The error operations here refer to that the switching power circuit 140 erroneously enters the power down mode. That is, in the present embodiment of the invention, when the switching power circuit 140 enters the power saving mode and the duty cycle of the output signal OUT of the switching power circuit 140 equals 0, the delay loop 330 controls the switching power circuit 140 to enter into the power down mode by delaying. In greater details, when the switching power circuit 140 enters the power saving mode and the duty cycle of the output signal OUT of the switching power circuit 140 equals 0, the switching power circuit 140 enters the power down mode after a delay period caused by the delay loop 330. The duration of the delay period is determined according to the needs.

The comparer 340 compares the node voltage N1 with the reference voltage $V_{DET2}$. For example, when the node voltage N1 is higher than the reference voltage $V_{DET2}$, the output signal PWM_OFF of the comparer 320 is in high logic status, and vice versa. When the output signal PWM_OFF is in high logic status, the switching power circuit 140 enters the power down mode. To the contrary, when the output signal PWM_OFF is in low logic status, the switching power circuit 140 resumes the normal mode.

The transistor 390 is a high power transistor, capable of providing high DC voltage to the transformer 130. The resistor R6 couples one terminal of the transistor 390 to the ground. The gate of the transistor 390 receives the output signal OUT generated by the PWM generating circuit 310, the source of the transistor 390 is coupled to the transformer 130, and the drain of the transistor 390 is coupled to the resistor R6. For the switching power circuit 140, the transistor 390 can be an external or a built-in transistor.

Figure 4:
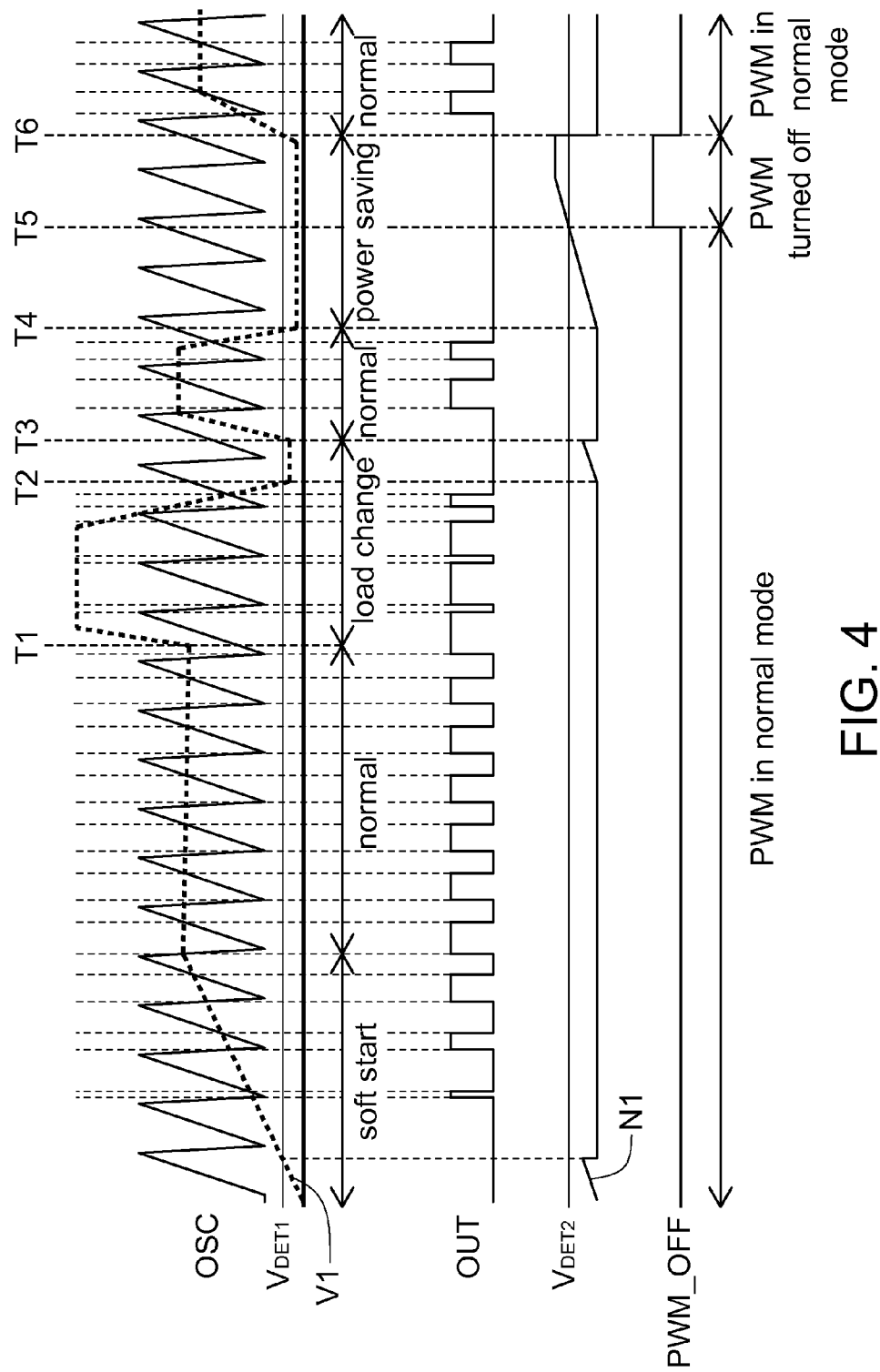
FIG. 4 shows a signal wave pattern of FIG. 3.

FIG. 4 shows a signal wave pattern of FIG. 3. Referring to FIG. 3 and FIG. 4, how the switching power circuit 140 is switched between the power down mode and the normal mode is shown. In FIG. 4, OSC denotes the signal outputted from the oscillator inside the PWM generating circuit 310.

Firstly, during the soft start period, the voltage V1 is boosted. Next, in a normal mode, the voltage V1 is fixed, and the duty cycle of the output signal OUT of the PWM generating circuit 310 is also fixed. Then, at time point T1, the load of the back-stage circuit 191 starts to change, and the voltage V1 boosts accordingly. For example, when the back-stage circuit 191 includes a light emitting diode (LED) and the brightness of the LED changes, which means the load for the power supply circuit of the present embodiment of the invention is changed.

During the load change period, the duty cycle of the output signal OUT of the PWM generating circuit 310 also changes. When the load becomes heavier, the duty cycle of the output signal OUT becomes larger. To the contrary, when the load becomes lighter, the duty cycle of the output signal OUT becomes smaller. After that, at time point T2, as the voltage V1 is lower than the reference voltage $V_{DET1}$, the output signal of the comparer 320 changes to high logic status from low logic status. Accordingly, the node voltage N1 starts to boost because the current source 331 charges the capacitor C4.

Thereafter, at time point T3, the power supply circuit 100 resumes into the normal mode, and the voltage V1 is boosted higher than the reference voltage $V_{DET1}$, and the node voltage N1 changes to low logic status because the comparer 320 outputs low logic output signals.

After that, at time point T4, the power supply circuit 100 enters the power saving status, the voltage V1 is lower than the reference voltage $V_{DET1}$, and the duty cycle of signal OUT equals 0% (meanwhile, the switching power circuit 140 has not yet entered into the power down mode). As the voltage V1 is lower than the reference voltage $V_{DET1}$, the node voltage N1 starts to boost. At time point T5 (that is, after the delay period), the node voltage N1 is already higher than the reference voltage $V_{DET2}$, so the signal PWM_OFF is at high logic status, and the switching power circuit 140 is turned off (the PWM generating circuit 310 inside the switching power circuit 140 will be turned off). As illustrated in FIG. 4, the delay time is determined according to the value of the reference voltage $V_{DET2}$. In the power saving mode, after the output signal OUT equals 0%, the switching power circuit 140 is turned off after the duty cycle (the period between time point T4 and time point T5 of FIG. 4). Turning off of the switching power circuit 140 implies that the PWM generating circuit 310 will be turned off, and the comparer 320, the delay loop 330 and the comparer 340 are still in the normal node.

Then, at time point T6, the power supply circuit 100 resumes to the normal mode (due to the request by the back-stage circuit 191 or the voltage V3 lower than the critical value), the voltage V1 boosts to be higher than the reference voltage $V_{DET1}$, so that the node voltage N1 and signal PWM_OFF become at low logic status at time point T6. Therefore, after time point T6, the switching power circuit 140 resumes the normal mode.

Figure 5:
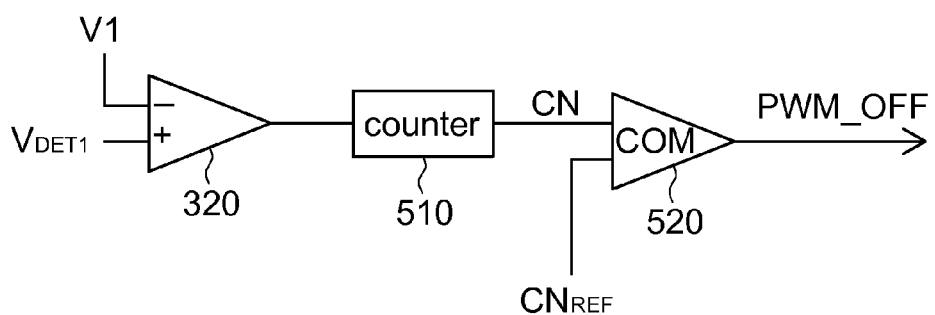
FIG. 5 shows a digital delay loop according to another embodiment of the invention.

In FIG. 3, the delay loop 330 is implemented by an analog circuit. However, in other embodiments of the invention, the delay loop 330 can also be implemented by a digital circuit. Referring to FIG. 5, a digital delay loop according to another embodiment of the invention is shown. As indicated in FIG. 5, the digital delay loop 330 includes a counter 510. When the voltage N1 is at low logic status, the counter 510 will be reset. To the contrary, when the voltage N1 is at high logic, the counter 510 will count. That is, the counter 510 counts the voltage N1, or the counter 510 counts high logic output signal of the comparer 320. The counter 510 outputs a count number CN to the comparer 520. The comparer 520 compares the count number CN with a reference count number $CN_{REF}$. When the count number CN is smaller than the reference count number $CN_{REF}$, the comparer 520 outputs the low logic signal PWM_OFF. On the contrary, when the count number CN is greater than or equal to the reference count number $CN_{REF}$, the comparer 520 outputs the high logic signal PWM_OFF. The reference count number $CN_{REF}$ is related to the delay time of the delay loop 330.

The power supply circuit disclosed in the above embodiment of the invention has many advantages exemplified below. In a power saving mode, the switching power circuit enters a power down mode to turn off the power consuming elements so to further save energy consumption.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A power supply circuit for providing a power voltage to a back-stage circuit, the power supply circuit comprising:
    a switching power circuit, controlling the power voltage;
    a closed loop feedback control that, in a normal mode, feeds back the power voltage to the switching power circuit in a closed loop;
    an open loop feedback control that, in a power saving mode, feeds back the power voltage to the switching power circuit in an open loop; and
    a transformer, having a primary side coupled to the switching power circuit, and a secondary side coupled to the back-stage circuit and the closed loop feedback control,
    wherein when the switching power circuit continuously detects the open loop and after the switching power circuit substantially enters in a zero output status for a delay period, the switching power circuit enters into a power down mode, the delay period related to voltage delay and voltage comparison,
    wherein the transformer couples an output voltage of the switching power circuit to the secondary side to generate the power voltage, and
    wherein the switching power circuit comprises
        a signal generating circuit coupled to the transformer, and
        a control circuit coupled to the signal generating circuit, for controlling the signal generating circuit to enter into the power down mode, the control circuit comprising
            a first comparer coupled to the closed loop feedback control, the first comparer comparing a first reference voltage and a first voltage fed back by the closed loop feedback control, and outputting a first comparing signal,
            a counter, counting the first comparing signal to generate a counting signal, and
            a second comparer, comparing the counting signal with a reference count number to output a control signal to the signal generating circuit, the control signal controlling whether the signal generating circuit enters into the power down mode.

2. The power supply circuit according to claim 1, wherein, when the back-stage circuit needs power supply, the closed loop feedback control feeds back the power voltage to the switching power circuit in the closed loop and the switching power supply circuit is operated in the normal mode.

3. The power supply circuit according to claim 1, wherein, a coupling period of the transformer is controlled by an output duty cycle of the switching power circuit.

4. The power supply circuit according to claim 1, wherein, the switching power circuit controls the output voltage in response to formation of the closed loop.

5. The power supply circuit according to claim 1, wherein, in the power saving mode, the open loop feedback control forms the open loop and makes the closed loop feedback control unable to form the closed loop, so that the power voltage is not fed back to the switching power circuit through the closed loop.

6. The power supply circuit according to claim 1, wherein, when the power voltage is lower than a critical value, the switching power circuit resumes the normal mode from the power down mode.

7. The power supply circuit according to claim 1, wherein, the closed loop feedback control comprises:
   a photo-coupling circuit coupled to the switching power circuit; and
   a voltage reference controller coupled to the photo-coupling circuit, wherein the voltage reference controller regulates the power voltage;
   wherein, in the normal mode, the photo-coupling circuit and the voltage reference controller form the closed loop which feeds back the power voltage to the primary side of the transformer from the secondary side of the transformer.

8. The power supply circuit according to claim 7, wherein, in the power saving mode, the voltage reference controller is activated and a node voltage of the voltage reference controller is suppressed by the open loop feedback control, so that the closed loop cannot be formed.

9. The power supply circuit according to claim 8, wherein, the open loop feedback control sinks a current provided by the voltage reference controller.

10. A power supply method, providing a power voltage to a back-stage circuit, the method comprising:
    feeding back the power voltage through a closed loop in a normal mode;
    feeding back the power voltage through an open loop in a power saving mode;
    entering into a power down mode when the open loop is continuously detected and after a switching power circuit substantially enters in a zero output status for a delay period, the delay period related to voltage delay and voltage comparison;
    comparing a first reference voltage and a first voltage fed back through the closed loop to output a first comparing signal;
    counting the first comparing signal to generate a counting signal; and
    comparing the counting signal with a reference count number to output a control signal, the control signal controlling whether to enter into the power down mode.

11. The power supply method according to claim 10, further comprising:
    forming the open loop and interrupting the closed loop when entering into the power saving mode.

12. The power supply method according to claim 10, further comprising:
    resuming the normal mode from the power down mode when the power voltage is lower than a critical value.

13. The power supply method according to claim 10, further comprising:
    regulating the power voltage by the closed loop.

* * * * *